United States Patent [19]

Daly

[11] Patent Number: 5,095,705
[45] Date of Patent: Mar. 17, 1992

[54] PROCESS FOR PRODUCING ENERGY FROM WATER FLOWING DOWN A BOREHOLE AND RECOVERY SAME

[76] Inventor: Oliver Daly, 134 A Steiner, Lafayette, La. 70508

[21] Appl. No.: 685,472

[22] Filed: Apr. 12, 1991

[51] Int. Cl.[5] .............................................. F03G 7/00
[52] U.S. Cl. .................................... 60/641.2; 60/649; 60/398
[58] Field of Search ................. 60/641.2, 398, 649, 60/674

[56] References Cited

U.S. PATENT DOCUMENTS

| 4,106,295 | 8/1978 | Wood | 60/674 X |
| 4,453,383 | 6/1984 | Collins | 60/641.14 X |
| 4,779,006 | 10/1988 | Wortham | 60/641.12 X |

FOREIGN PATENT DOCUMENTS 0142980 11/1980 Japan ..................... 60/641.2

Primary Examiner—Allen M. Ostrager
Attorney, Agent, or Firm—Pravel, Gambrell, Hewitt Kimball & Krieger

[57] ABSTRACT

A process for producing energy from introducing water down a borehole, which includes (a) providing a borehole having a depth of at least 20,000 feet; (b) providing a casing in the borehole of a certain diameter; (c) introducing an internal pipe within the casing of a diameter less than the casing to define an annulus therebetween; (d) providing a means to introduce quantities of water down the inner pipe at predetermined intervals; (e) providing an air turbine at the upper portion of the inner pipe so that when the water is introduced down the inner pipe, a vacuum is established above the water flowing down the pipe, and air is sucked into the inner pipe through the blades of the air turbine to run the turbine; (f) allowing the water, upon reaching a certain depth to turn to steam at the lower end of the inner pipe; and (g) returning the steam up the annulus between the inner pipe and the casing to the upper end of the casing and exiting the system.

10 Claims, 3 Drawing Sheets

PROCESS FOR PRODUCING ENERGY FROM WATER FLOWING DOWN A BOREHOLE AND RECOVERY SAME

BACKGROUND OF THE INVENTION

1. Field Of The Invention

The process of the present invention pertains to the production of energy from the use of water introduced down a borehole. More particularly, the present invention relates to process for producing energy through an air turbine from the introduction of water down a borehole, the utilization of geothermal heat to return this water in the form of steam, and the further production of energy from the water converted to steam. There may be further provided in the process the production of potable water from seawater utilizing the present process.

2. General Background

In the field of production of energy from various sources, one of the most promising avenues is energy from geothermal sources, or from underground-produced steam. This particular source of energy, although promising, has been very difficult to achieve on a widespread and economic scale, and will require a vast expense of time and money in research. However, at the present time, there exists a vast number of abandoned oil and gas wells, particularly in the states of Louisiana and Texas, which have been drilled and cased to some 20,000 to 30,000 feet, and may hold some promise to be utilized in conjunction with the production of geothermal energy.

The use of various types of systems introduced downhole to produce energy is widely known, the most pertinent being the subject of patents granted in the field. A patentability search on the subject resulted in the following patents:

| PAT. NO. | TITLE | ISSUE DATE |
|---|---|---|
| 4,077,220 | "Gravity Head Geothermal Energy Conversion System" | Mar. 7, 1978 |
| 4,181,468 | "Geothermal Energy Pump Monitor And Telemetric System" | Jan. 1, 1980 |
| 4,325,681 | "Geothermal Irrigation Pump" | Apr. 20, 1982 |
| 4,541,246 | "Limitless Heat Source Power Plants" | Sep. 17, 1985 |
| 4,866,939 | "Method And Apparatus For Extracting Geothermal Fluid" | Sep. 19, 1989 |
| 3,470,943 | "Geothermal Exchange System" | Oct. 7, 1969 |
| 3,857,244 | "Energy Recovery And Conversion System" | Dec. 31, 1974 |
| 4,043,129 | "High Temperature Geothermal Energy System" | Aug. 23, 1977 |
| 4,576,006 | "Geothermal Hot Water Transportation And Utilization System" | Mar. 18, 1986 |

SUMMARY OF THE PRESENT INVENTION

The process of the present invention solves the problems in the art in a simple and straightforward manner. What is provided is a process for producing energy from introducing water down a borehole, which includes (a) providing a borehole having a depth of at least 20,000 feet; (b) providing a casing in the borehole of a certain diameter; (c) introducing an internal pipe within the casing of a diameter less than the casing to define an annulus therebetween; (d) providing a means to introduce quantities of water down the inner pipe at predetermined intervals; (e) providing an air turbine at the upper portion of the inner pipe so that when the water is introduced down the inner pipe, a vacuum is established above the water flowing down the pipe, and air is sucked into the inner pipe through the blades of the air turbine to run the turbine; (f) allowing the water, upon reaching a certain depth to turn to steam at the lower end of the inner pipe; and (g) returning the steam up the annulus between the inner pipe and the casing to the upper end of the casing and exiting the system.

There may further be provided a steam turbine at the upper end of the casing to be driven by the upward moving steam.

Further there may be provided a closed loop system wherein the water upon returning up the casing as steam, is reconverted into water, and recirculated through the system to produce energy.

Further there may be provided a closed loop system which would be used in wells that contain fluid of some type, which fluid would preclude the use of the open system.

Further, if salt water is used in the system, the salt may be evaporated out of the water when it is converted into steam, and potable water returned to the surface.

Therefore, it is a principal object of the present invention to provide a process for turning water flowing down a borehole into useful energy;

It is a further principal object of the present invention to provide a process for producing energy through the use of water flowing downhole, creating a vacuum from the flow, and allowing air to run an air turbine, as the air flows to fill the vacuum;

It is a further principal object of the present invention to provide a system for producing energy by allowing water flowing downhole to run an air turbine, and upon returning up hole, as steam to generate energy through a steam turbine; and It is still a further object of the present invention to allow salt water to flow down a borehole, provide energy through air flow subsequently, and to produce steam, and liquify to produce potable water.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
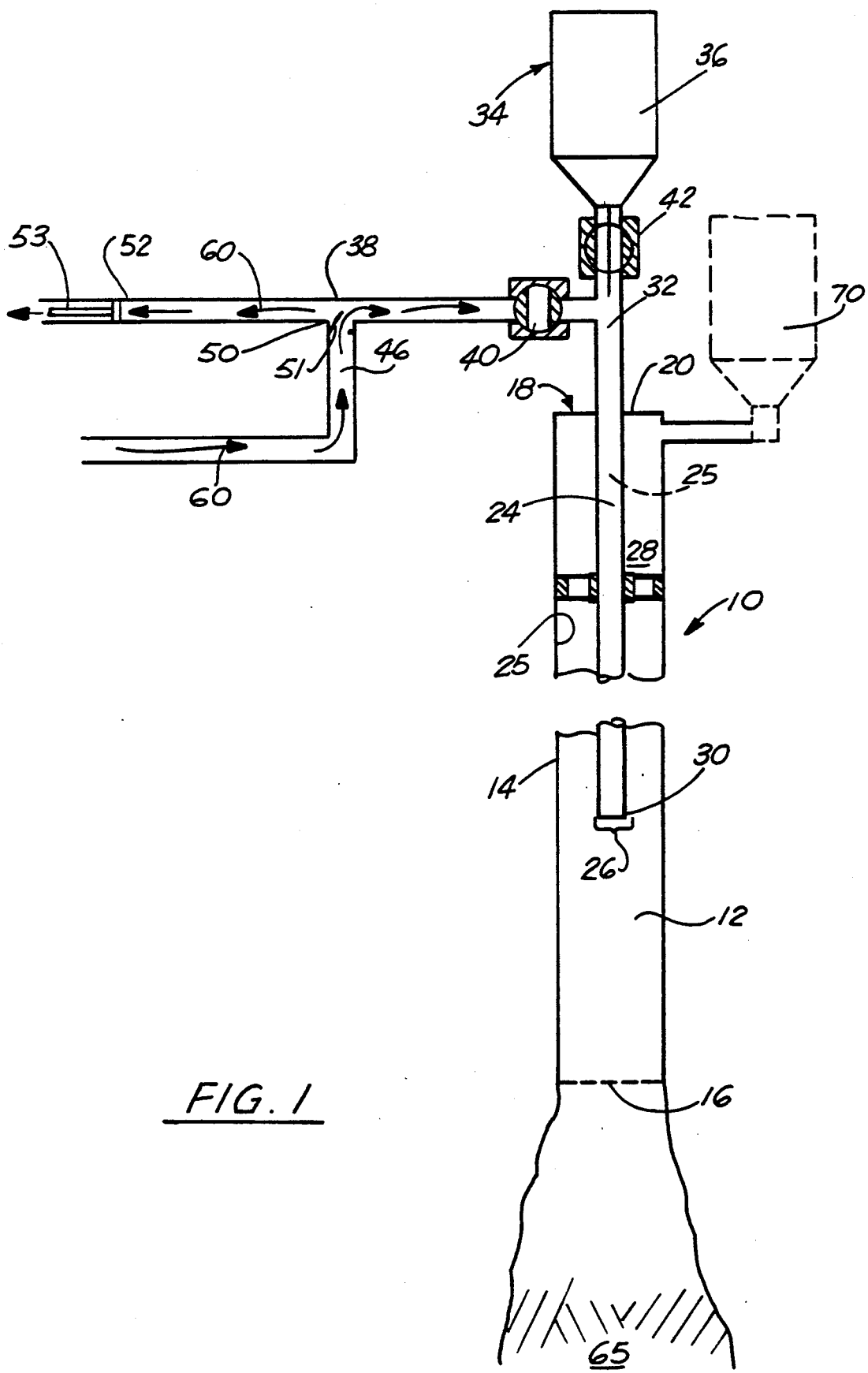
FIG. 1 illustrates a representational view of the preferred embodiment of the system ready for use in the process of the present invention.
Figure 2:
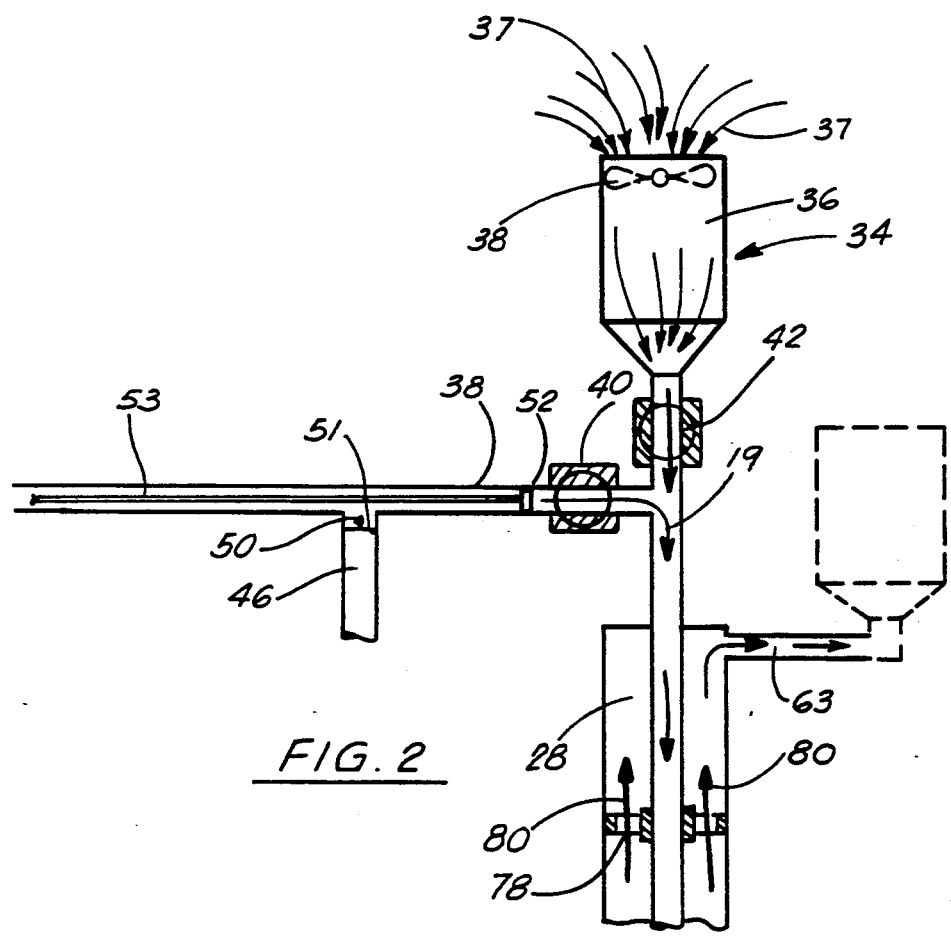
FIG. 2 illustrates a representational view of the preferred embodiment of the system being used in the process of the present invention.
Figure 3:
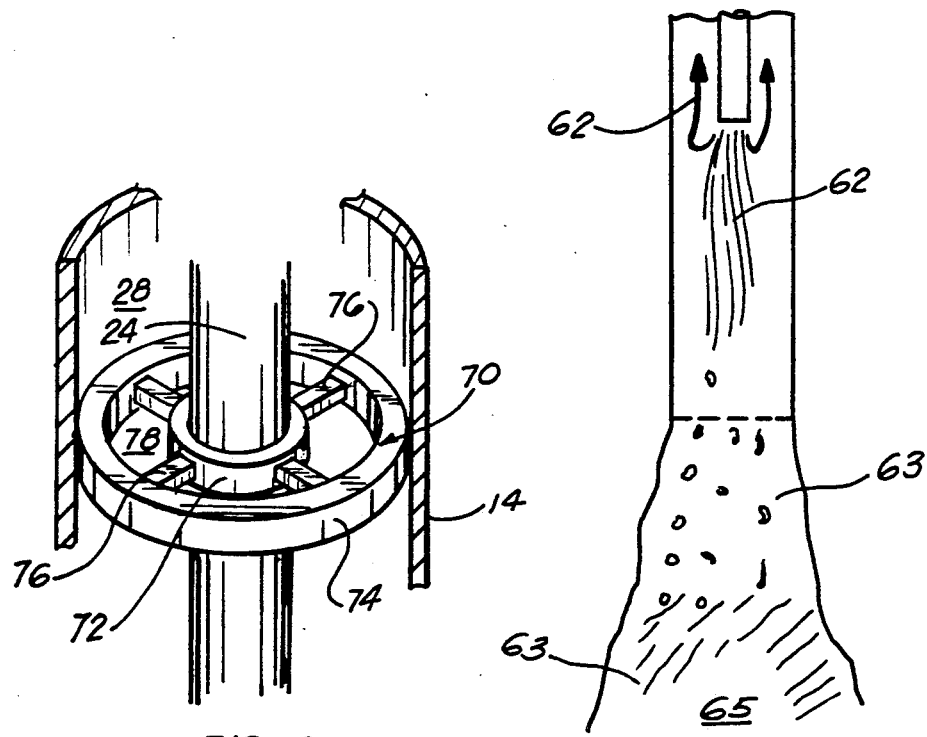
FIG. 3 illustrates a view of the stabilizing apparatus utilized between the inner pipe and the casing in the process of the present invention.

The system utilized to perform the process of the present invention in illustrated in the preferred embodiment in FIGS. 1-3 by the numeral 10. As illustrated in the Figures, particularly FIGS. 1 and 2, system 10 would comprise a vertical borehole 12, which would be of the type which would occur as a result of a newly drilled or abandoned oil or gas well, which would be preferably 20,000 to 30,000 feet in depth, or being at least a depth so that water which would flow down the borehole would generate enough depth to be converted into steam. Borehole 12 would preferably be of the type that would be "cased"; that is, having a pipe or casing 14 inserted within it, to define a continuous metal skin to the borehole 12, and so that the walls of the borehole are held in place along its entire length, and any entry into the borehole from the sides is avoided due the metal casing inserted therein. For the particular embodiment which will be discussed further, the cased borehole 12 could be open-ended at its lower end 16, as seen in FIG. 1, resulting in an uncased borehole bottom area 65.

Further as illustrated in FIGS. 1 AND 2, casing 14 of borehole 12 would be sealed at its upper end 18, with a cap member 20, the reason to be explained further.

Also provided within the interior space 22 of borehole 12 would be an inner pipe 24, having a vertical length, substantially to the 20,000 foot depth, and having a slightly smaller diameter 26 than borehole 12, to define an annular space 28 between the wall of inner pipe 24 and the inner wall 2 of casing 14 within borehole 12. As illustrated, the lower end 30 of inner pipe 24 would terminate within casing 14, and the upper end portion 32 would protrude through the cap member 20 of casing 14 to interconnect to the other components of the system 10.

Turning now to those components, as illustrated in FIG. 1, there is illustrated, at the upper terminating end of inner pipe 24, a turbine means 34, of the type known in the art, which would be driven by the flow of air through its body portion 36, to produce energy as the blades 38 (FIG. 2) are rotated by the flow of air, as seen by arrows 37, therethrough. Further there is provided a length of pipe 38 adjoining at a right angle into the wall of the upper portion 32 of inner pipe 24, for allowing fluid flow through pipe 38 to flow into pipe 24, as will be discussed. There is provided a first plug valve 40 in the flow bore of pipe 38 to interrupt flow therethrough as needed, and a second valve 42 to interrupting air flow from the turbine 34 into pipe 24 as required. Both valves should be of similar construction, probably either plug valves or possibly butterfly valves. The two valves would have a linkage, either mechanical or electrical, which would provide for the opening of one valve while closing the other.

Pipe 38 has a second pipe 46 interconnected into its wall at point 50 for introducing fluid flow into the bore of pipe 38 when needed. Further there is a flapper valve 51 between the connecting point of pipe 46 to pipe 38 for allowing the fluid to flow in one direction from pipe 46 to pipe 38. Further as illustrated, there is provided a means to force the fluid flowing into pipe 38 from pipe 46 into pipe 24 at a predetermined sequence of a predetermined quantity. This means comprises a piston 52 to be moveable within the bore of pipe 38, via a shaft 53, between a first rear position to allow pipe 38 to receive water to a second forward position to force the water from pipe 38 into pipe 24. This process, together with the use of the other components of the system will be discussed fully in reference to FIG. 2 of the drawings.

As was stated earlier, the intent of the system, in its preferred embodiment is to provide a process for turning water into steam, and in doing so driving an air turbine to produce energy. Turning to FIG. 2, there is illustrated the system that was discussed in FIG. 1. It was noted in FIG. 1 that in that step on the process, the plug valve 40 has been placed in the closed position. Simultaneously, piston member 50 has been placed in its first rear position, and salt water, in this particular embodiment is allowed to flow from pipe 42 into pipe 38 as illustrated by arrows 60. After pipe 38 has been filled with brine between piston 52 and plug valve 40, plug valve 40 is opened, and piston 52 is moved to the forward position as seen in FIG. 2. Flapper valve 51 would prevent water from returning into pipe 46 when piston member 52 is moved forward. The quantity of water contained in pipe 38, which would be a predetermined fixed quantity selected for optimum results, would then flow into pipe 24, and by gravity, would begin travelling down the internal bore 25 of pipe 24 travelling down to the lower end 30 of pipe 24 some 20,000 feet below. As it enters pipe 24, plug valve 40 is immediately closed and second valve 42 is opened. The force of water 19 travelling down the inner bore 25 of pipe 24 would create a substantial vacuum, pulling a quantity of air (arrows 37) through the fan blades 38 of turbine 34, thus providing a source of power to the turbine 34, from the air flow therethrough, and allowing the turbine to produce energy. As the vacuum was reduced, through monitoring in the inner pipe 24, the process of introducing water into pipe 24 would be repeated, thus in effect creating a sequential introduction of water into pipe 24 to effect a continuing vacuum in the pipe to maintain a consistent air flow through turbine 34.

Turning now to the lower end of pipe 24, again reference is made to FIG. 2. As the quantum of water reaches a certain depth, in the neighborhood of 20,000 feet, it would be heated by geothermal heat to be converted to steam 62, and upon exiting pipe 24, would return up the annular space 28 between the inner pipe 24 and casing 14, and would exit via pipe 63 at the upper end of casing 24.

As seen in phantom view, there may be provided a second turbine 70, in this case; a steam turbine through which the steam 62, that is returning up the annular space 28 of borehole 14, is being converted back to water, would provide a second source of energy to operate the steam turbine and yet provide more energy from the system. It should be kept in mind that borehole 12, being preferably open-ended in this embodiment, would receive a great quantity of salt as a residue from the brine, which would be deposited at the bottom of the borehole 12. In this embodiment, the steam returning, now free of salt, may easily be converted into potable water, upon being reconverted to water.

As illustrated in FIG. 3, there is seen the means to maintain inner pipe 24 centrally and vertically positioned within casing 14. This means comprises a ring member 70, having a first inner ring 72 positioned around the wall of inner pipe 24, with a larger concentric ring 74 positioned along the interior wall of outer casing 14. There is further provided a plurality of radiating arms 76 interconnecting the inner right 72 and outer ring 74 to provide the stabilizing and central positioning of inner pipe 24 within casing 14. Further there is provided flow spaces 78 between the arms 76 to allow the steam to flow upward within the annular space 28 as seen by the arrows 80 in FIG. 3.

Figure 4:
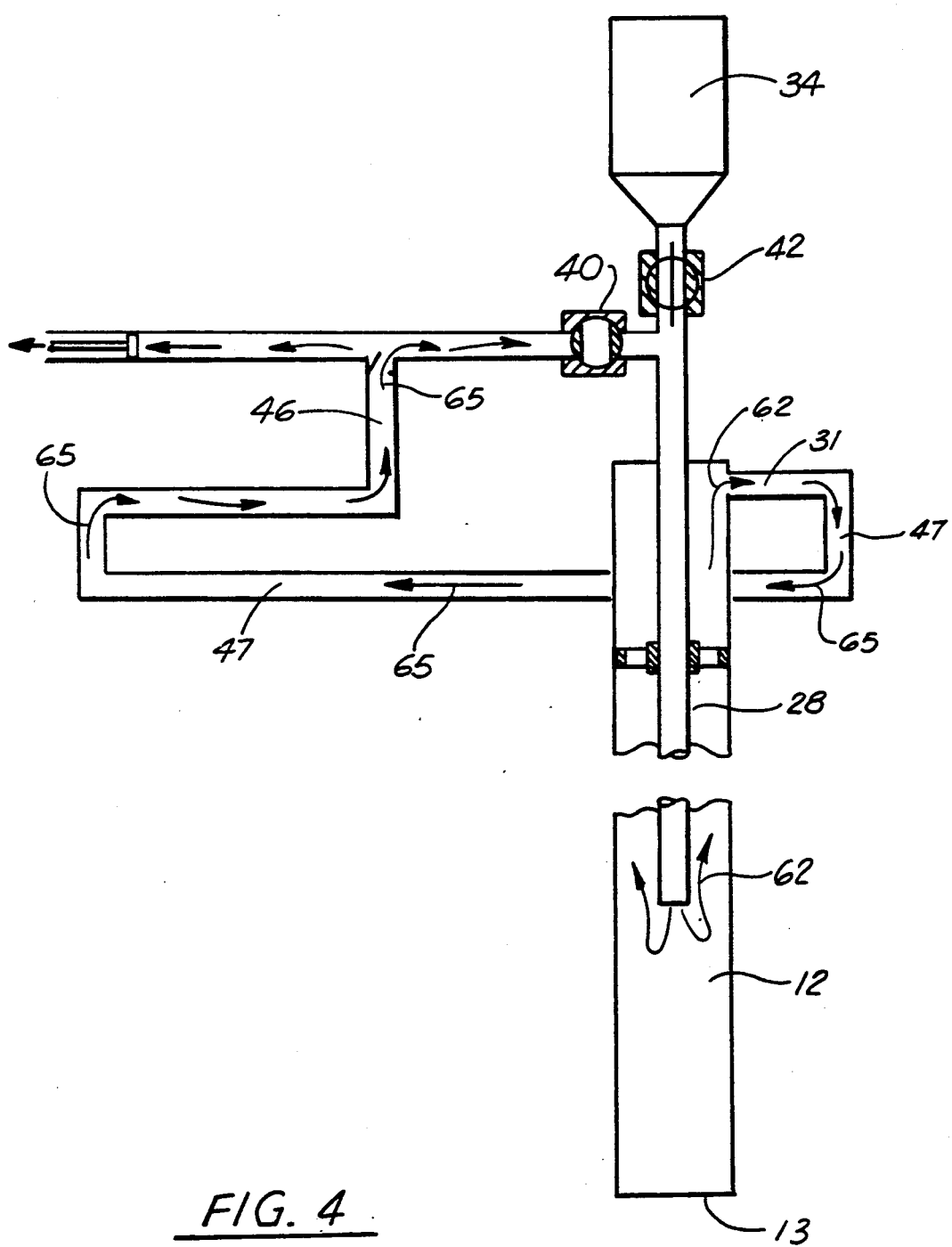
FIG. 4 illustrates a representational view of an additional embodiment of the system utilizing the process of the present invention in a closed-loop system.

In an additional embodiment of the system, reference is made to FIG. 4, which has been labeled with the numerals to coincide with the principal embodiment, with the exception that, as illustrated, this embodiment would be the closed-loop system of the process, and would require that borehole 12 be closed by casing 14 having a sealed bottom end 13 as illustrated. In this embodiment is foreseen that it would provide a means to utilize clean or even distilled water in the system which could be recirculated through the system, and would require therefore very little new water added to the loop. As illustrated, the water, like in the preferred embodiment would be converted to steam, but would not leave a residue within the casing as the steam 62 returned up the annular space 28. The steam 62, in this embodiment, would be reconverted into water 65, and the water 65 would be rerouted from line 31 into a further line 47 to rejoin the entry line 46 to be reentered into line 38 to complete the cycle. With this embodiment utilizing a closed loop process, the water would remain uncontaminated, and would therefore maintain the system free of residue and able to produce a continuing amount of energy with the use of substantially the same quantity of water. This system would be a great deal cleaner and less subject to deterioration from the effect of brine on the metal pipe.

Although not illustrated in FIG. 4, it is foreseen that as steam exits borehole 12, there may be a steam turbine of the type seen in FIG. 2, which would be driven by the steam 62, before it is reconverted into water and returns via line 47 back into the closed-loop for recycling through the system.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for producing energy from water flow, comprising the following steps:
    a) providing a vertical borehole of sufficient depth to convert liquid water to steam through geothermal energy as the water travels theredown;
    b) positioning an internal feed pipe into the borehole;
    c) providing an air turbine on the upper end of the feed pipe to allow air flowing into the feed pipe to flow through the air turbine;
    d) introducing a predetermined quantity of water into the feed pipe below the position of the turbine;
    e) allowing the water to flow down the feed pipe and to pull air through the turbine as the water flowed down the pipe; and
    f) repeating step (d) of the process at predetermined timed intervals to provide a substantially constant flow of air through the air turbine.

2. The process in claim 1, further comprising the step of allowing the water to be converted to steam as it reaches a certain depth within the borehole.

3. The process in claim 1, further comprising the step of recapturing the steam as it returns up the borehole to drive a steam turbine.

4. The process in claim 1, further comprising the step of providing a means to move a predetermined amount of water into the borehole from a water source.

5. The process in claim 4, wherein the means further comprises a piston moveable to force the water into the borehole.

6. The process in claim 1, wherein the water introduced into the borehole is salt water.

7. A system for producing energy from water flow, comprising the following steps:
    a) providing a vertical borehole of sufficient depth to convert liquid water to steam through geothermal energy as the water travels theredown;
    b) positioning an internal feed pipe into the borehole;
    c) providing an air turbine on the upper end of the feed pipe to allow air flowing into the feed pipe to flow through the air turbine;
    d) introducing a predetermined quantity of water into the feed pipe below the position of the turbine;
    e) allowing the water to flow down the feed pipe and to pull air through the turbine as the water flowed down the pipe;
    f) repeating step (d) of the process at predetermined timed intervals to provide a substantially constant flow of air through the air turbine; and
    g) allowing the water flowing down the feed pipe to be converted into steam; and
    h) providing a steam turbine for capturing the steam that is moving up the borehole to produce energy as the steam flows through the steam turbine.

8. The process in claim 7, wherein the water being introduced into the borehole is salt water.

9. The process in claim 7, wherein the water, following the conversion to steam, recondenses as potable water and the salt remains in the borehole.

10. The process in claim 7, wherein the steam that is condensed into water may be rerouted into the system to be reintroduced into the borehole as recited in step (d) of the process.

* * * * *